UNITED STATES PATENT OFFICE.

HEINRICH L. B. TOOBE, OF BROOKLYN, NEW YORK, ASSIGNOR, BY MESNE ASSIGNMENTS, TO PETER PEIFFER, OF NEWARK, NEW JERSEY.

ART OF PREPARING METAL PLATES FOR LITHOGRAPHIC PRINTING.

SPECIFICATION forming part of Letters Patent No. 542,382, dated July 9, 1895.

Application filed September 27, 1894. Serial No. 524,296. (No specimens.)

*To all whom it may concern:*

Be it known that I, HEINRICH L. B. TOOBE, a subject of the Queen of Great Britain, residing at Brooklyn, in the county of Kings and State of New York, have invented a certain new and useful Improvement in the Art of Preparing Metal Plates for Lithographic Printing, of which the following is a specification.

My invention relates to the treatment of aluminium plates to adapt them for use in printing by the lithographic process, and also to the repreparation of such plates which have been once used, so as to adapt them for reuse in printing new designs.

I have found by experiment that plates of aluminium can be used for lithographic printing with excellent results when prepared in accordance with my improved process.

My process is also adapted for the treatment of plates of other metals or alloys—such, for example, as brass or aluminium or other bronze.

In common with other modes of preparing metal plates, the first step is to dull the surface of the metal. This may be done by mechanical means, and preferably by the agency of a sand-blast. I then wash the plates in an acidulated-alum solution made by dissolving alum in boiling water, to which a small quantity of nitric acid is added. Suitable proportions are one ounce of alum and a few drops of nitric acid to a pint of water. I then prepare a bath consisting of a solution of alum, (sulphate of alumina and potassa,) nitrous acid, chloride of calcium, and sulphate of alumina. Suitable proportions of the materials for this bath are, to one gallon of water, of calcium chloride, one pound; of sulphate of alumina, one pound; of nitrous acid, two pounds; of powdered alum, five pounds. After the plates have been treated in this bath for a few minutes and then washed in pure water and dried, they are adapted for use in lithographic printing in the same manner as lithographic stones and with excellent results.

In order to adapt the plates for use a second time with a new subject, the ink and color are removed by washing with turpentine or other suitable cleansing agent, and the plates are then treated with a solution of sulphuric and hydrochloric acid, about one pound of each in four gallons of water, and are afterward washed in pure water. They are then treated as before in the bath of a solution of alum, chloride of calcium, sulphate of alumina, and nitrous acid. They are then rinsed and dried as before and are ready for a new job, which can be printed with the same excellent results as with the newly-prepared plates.

The process is likewise applicable to treating plates made of alloys of aluminium, such as aluminium-bronze.

In treating aluminium plates by my improved process the chemicals are so incorporated with the metal that the surface is not liable to crack, as is the case when the applied chemicals form a superficial layer on top of the plate.

Aluminium plates prepared by my improved process are nearly as durable as the best stones and answer for every printing process for which stones are used.

The following is what I claim as new in my above-described invention and desire to secure by Letters Patent:

1. The process of treating plates of aluminium or other suitable metal, to adapt them for lithographic purposes which consists in washing the surface in an acidulated alum solution and then applying thereto a solution of alum (sulphate of potassa and alumina), chloride of calcium, sulphate of alumina and nitrous acid, substantially as described.

2. The process herein described for preparing metal plates for lithographic printing which consists of suitably cleansing the surface, removing the previous design by washing with a solution of sulphuric and hydrochloric acid and then treating in a bath consisting of a solution of alum, sulphate of alumina, chloride of calcium and nitrous acid, substantially as described.

HEINRICH L. B. TOOBE.

Witnesses:
C. GOTTSCHALK,
M. PARTINGTON.